United States Patent [19]

Cory

[11] Patent Number: 4,765,694
[45] Date of Patent: Aug. 23, 1988

[54] REPLACEABLE ROAD PAD FOR TRACK SHOE OF TRACK LAYING VEHICLE

[75] Inventor: Robert M. Cory, Roseville, Mich.

[73] Assignee: General Dynamics Land Systems, Inc., Warren, Mich.

[21] Appl. No.: 35,657

[22] Filed: Apr. 7, 1987

Related U.S. Application Data

[62] Division of Ser. No. 752,186, Jul. 3, 1985, Pat. No. 4,700,992.

[51] Int. Cl.[4] .................... B62D 55/26; B62D 55/275; B62D 55/28
[52] U.S. Cl. .................................... 305/35 R; 305/39; 305/51
[58] Field of Search ................. 305/35 R, 36, 39, 42, 305/46, 51, 54, 56, 58 R, 58 PC, 59, 60

[56] References Cited

U.S. PATENT DOCUMENTS

| | | | |
|---|---|---|---|
| 2,332,976 | 10/1943 | Saurer et al. | 305/10 |
| 2,353,124 | 7/1944 | Burgess | 305/10 |
| 2,371,015 | 3/1945 | Allen et al. | 305/36 |
| 2,371,071 | 3/1945 | Schonitzer | 305/36 |
| 2,719,758 | 10/1955 | Proske | 305/36 |
| 3,266,853 | 8/1966 | Korner et al. | 305/36 |
| 3,357,750 | 12/1967 | Reynolds et al. | 305/11 |
| 3,721,476 | 3/1973 | Anderson | 305/58 X |
| 3,870,380 | 3/1975 | Korner | 305/36 |
| 4,139,241 | 2/1979 | Huhne et al. | 305/51 |
| 4,165,906 | 8/1979 | Fix | 305/51 |
| 4,262,973 | 4/1981 | Grilli et al. | 305/54 |

FOREIGN PATENT DOCUMENTS 1152631  8/1963  Fed. Rep. of Germany ........ 305/36

Primary Examiner—Robert B. Reeves
Assistant Examiner—Russell D. Stormer
Attorney, Agent, or Firm—Brooks & Kushman

[57] ABSTRACT

An endless track (52) for a track laying vehicle has a construction that facilitates replacement and repair of track components as well as providing an extended lifetime of use as compared to conventional vehicle tracks. The components of the track which facilitate its construction and maintenance include a track shoe (60), a replaceable road pad (62) for the track shoe (60), a pin assembly (64) for connecting laterally aligned pairs of the track shoes (60), a hollow pin (66) of the pin assembly (64), a center guide (68) that guides the track on the associated vehicle roadwheels, an end connector (72) that connects ends of the pins (66) associated with adjacent shoe assemblies (70), and a center connector (74) that cooperates with the end connectors (72) in connecting the shoe assemblies (70).

5 Claims, 11 Drawing Sheets

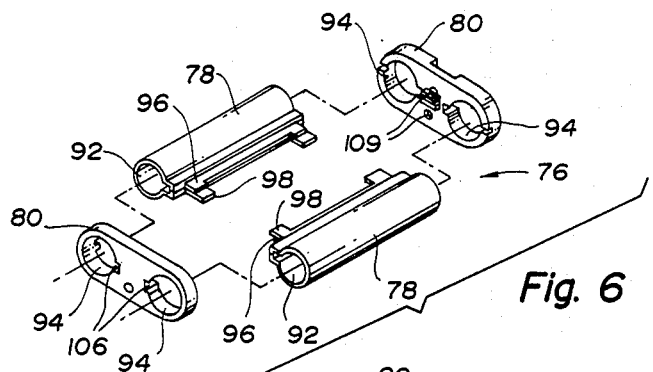
Fig. 6
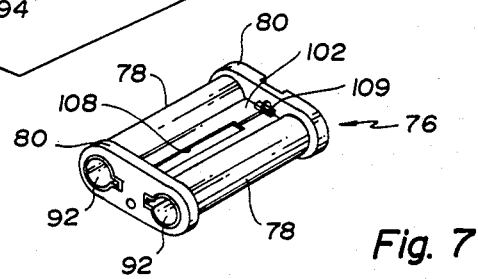
Fig. 7
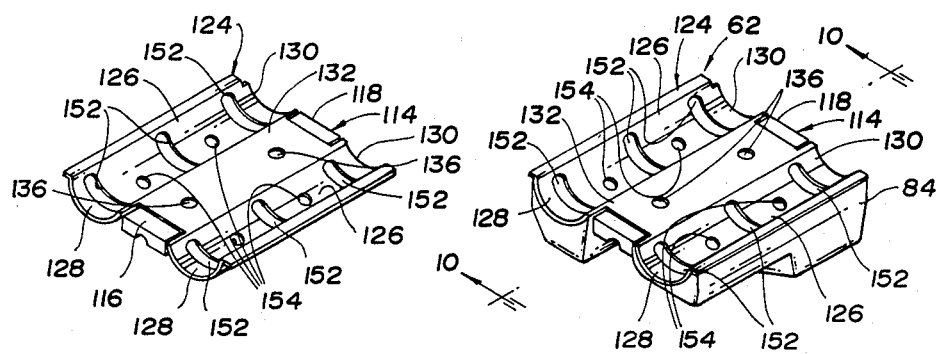
Fig. 8
Fig. 9

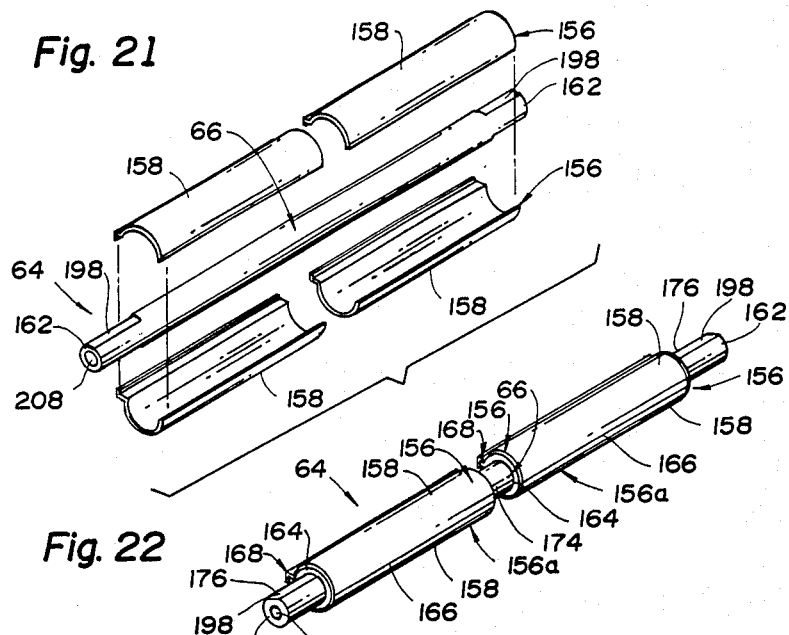
Fig. 21
Fig. 22
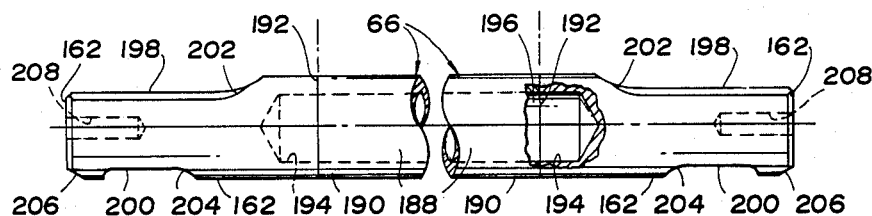
Fig. 23
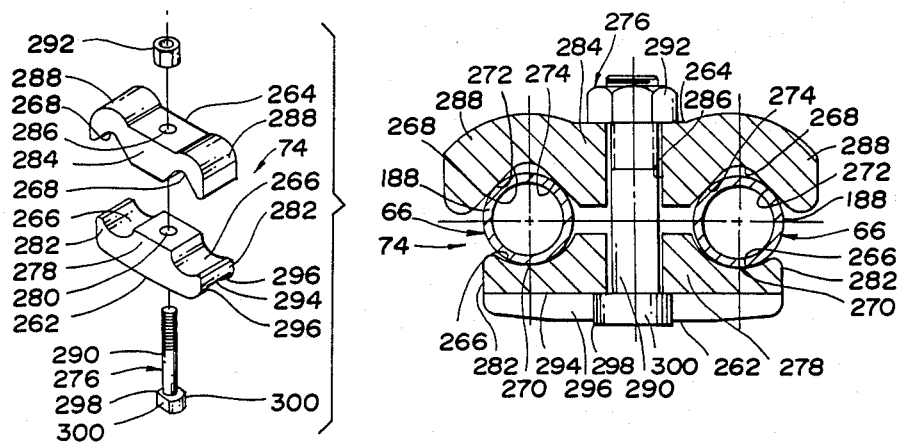
Fig. 24
Fig. 25

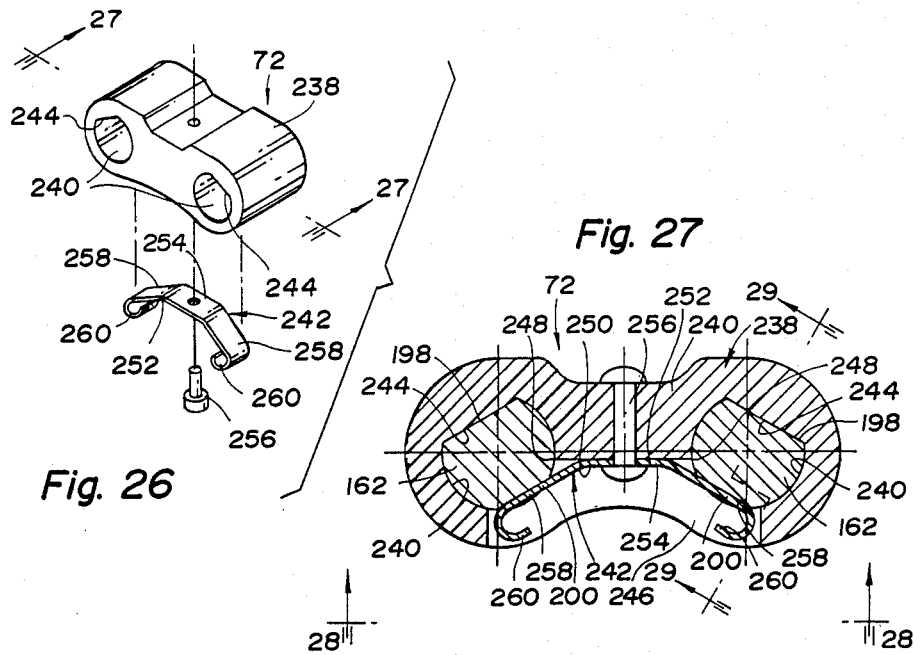
Fig. 26
Fig. 27
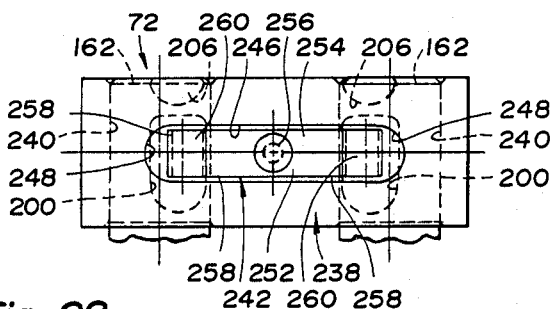
Fig. 28
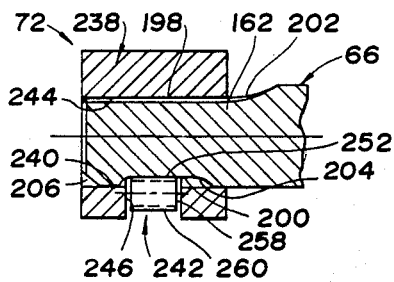
Fig. 29

REPLACEABLE ROAD PAD FOR TRACK SHOE OF TRACK LAYING VEHICLE

This is a divisional of co-pending application Ser. No. 752,186 filed on July 3, 1985, now U.S. Pat. No. 4,700,992.

TECHNICAL FIELD

This invention relates to an endless track and components thereof for a track laying vehicle.

BACKGROUND ART

Endless tracks have been used for many years with vehicles such as tanks to facilitate off-the-road travel. A pair of such tracks are conventionally utilized with each vehicle at each of its lateral sides. An outwardly facing side of each track engages the ground while an inwardly facing side of the track engages an associated set of roadwheels on the vehicle and a drive sprocket, a compensating idler wheel, and support rollers along an upper reach of the track above the roadwheels. The constantly increasing weight and speed of track laying vehicles has resulted in a decrease in the track life and a constant increasing need for track maintenance by either repair or replacement. However, conventional endless tracks are not designed to facilitate track maintenance in the field as would most desirably be the case.

The conventional construction of an endless track for a track laying vehicle includes shoe assemblies which are connected along the length of the track with each shoe assembly including a pair of laterally spaced track shoes connected by an associated pair of pins. Each shoe assembly conventionally has a metal shoe housing on which an outwardly facing road pad and an inwardly facing roadwheel pad are mounted. While roadwheel pads do not normally wear significantly, road pads normally do not last more than 800 to 1000 miles. One particular problem is road pad chunking that results from the heat produced with higher speeds and greater weights of present day tanks. Prior attempts to improve track designs have included stamped housing members such as shown by U.S. Pat. Nos. 1,313,266 Couch; 2,301,954 Knox; 2,327,909 Krotz; 2,353,124 Burgess; and 2,548,626 Sinclair. However, the stamped housings disclosed by these prior references have not received any significant commercial acceptance.

To facilitate track maintenance, road pads of track shoes have previously been replaceable. Such replacement is usually achieved by use of a threaded connection that can loosen during use. Replaceable road pads utilizing threaded connections are illustrated by U.S. Pat. Nos.: 2,332,976 Saurer et al; 3,357,750 Reynolds et al; and 4,262,972 Falk. U.S. Pat. No. 2,353,124 Burgess discloses a track shoe in which the road pad is secured by rivets which would eliminate the loosening problem present with threaded connections; however, such rivets make replacement of the road pad more difficult so that the replacement cannot be performed as a field maintenance operation. Likewise, U.S. Pat. No. 4,139,241 Huhne et al discloses a track shoe wherein deformation of the resilient pad allows insertion of retainer elements into claw-like projections; however, the assembly device utilized to perform the pad deformation also inhibits the replacement of the road pad as a field maintenance operation.

Laterally aligned track shoes are conventionally connected by a pair of pin assemblies that extend through the housings of the shoes. These pin assemblies conventionally each include an outer sleeve that includes a pair of sleeve portions respectively located within the housings of the two shoes connected by the pin assembly. Each pin assembly also includes a pin that extends through both sleeve portions and rubber bushings that are interposed between the pin and the sleeve portions by compression upon insertion of the pin into the sleeve portions. Such compression must be sufficient so that there is no rotation between the bushing and the outer sleeve portions or the pin upon bending of the track during use. However, such compression of the bushing results in a greater resistance to the required bending during use and a consequent greater power requirement for driving of the associated vehicle. Conventional pin assemblies incorporating compressed bushings are disclosed by U.S. Pat. Nos. 1,973,214 Lamb; 2,089,210 Knox et al; 2,301,954 Knox; 2,332,976 Saurer at al; 3,357,750 Reynolds et al; 4,139,241 Huhne et al; and 4,195,887 Ruddell.

Hollow pins have previously been utilized with vehicle tracks to reduce the track weight. See for example U.S. Pat. Nos. 1,863,858 Knox; 1,973,214 Lamb; 3,762,778 Boggs et al; 3,948,574 Baller; 4,120,537 Roley et al; 4,126,359 Holze; 4,163,589 Fox et al; 4,195,887 Ruddell; 4,265,084 Livesay; 4,288,172 Livesay et al; 4,324,437 Narang; and 4,395,074 Haldimann et al. However, such hollow pins reduce the strength of the ends of the pins where end connectors are secured to provide connection between adjacent shoe assemblies of the track and, as such, present a strength problem.

To provide guiding of vehicle tracks, each shoe assembly of conventional tracks includes a center guide that projects in an inward direction to be received within a center slot in the roadwheels. These center guides are conventionally designed to clamp onto central portions of adjacent pins of adjacent shoe assemblies to cooperate with the pin end connectors in securing the shoe assemblies to each other. The center guides are conventionally clamped to the pins by threaded connections that have the same loosening problem involved with conventional replaceable road pads as discussed above. Such prior center guides for vehicle tracks are disclosed by U.S. Pat. Nos. 2,089,210 Knox et al; 2,283,936 Knox; 2,301,954 Knox; 2,332,976 Saurer et al; 3,357,750 Reynolds et al; 3,467,446 Seelbach et al; 3,582,156 Korner et al; 4,139,241 Huhne et al; and 4,262,972 Falk.

As mentioned above, adjacent shoe assemblies are conventionally connected by end connectors that extend between the adjacent pin ends. These ends connectors conventionally include a wedge connection that is secured by a threaded bolt and/or nut. Such threaded fastening of the wedge connector can loosen during use and requires a greater amount of time for installation and removal than is desirable. Prior end connectors for vehicle tracks are disclosed by U.S. Pat. Nos.: 1,028,893 Luther; 1,282,326 Turnbull; 1,446,870 Borst, Jr.; 1,913,098 Alden; 2,957,731 Backhaus; 3,032,376 Blazek et al; 3,056,309 Horste; 3,467,446 Seelbach et al; 4,175,798 Korner et al; and 4,262,973 Grilli et al.

Between the opposite pin ends, adjacent track shoes of vehicle tracks are conventionally connected by the clamping of the center guides extending between intermediate portions of the adjacent pins as mentioned above at a location laterally between the shoes of the track. The dual function of guiding and connecting the adjacent pins results in a substantial loading during use.

Usually, the center guide clamps onto each intermediate pin portion with two lines of contact that results in "reseating" due to the substantial loading involved during use. Such reseating can ultimately produce wear that loosens the center connection between the pins and the resultant useful lifetime of the track.

DISCLOSURE OF INVENTION

An object of the present invention is to provide an improved vehicle track and improved components thereof which have a modular construction that facilitates component replacement even in a field maintenance situation to thereby provide an extended lifetime of effective use.

In carrying out the above object, a shoe for an endless track of a track laying vehicle is constructed in accordance with the present invention to include a binocular-shaped housing including a pair of formed sheet metal housing members with the same cross section as each other. This construction of the shoe housing permits both housing members to be fabricated from the same formed sheet metal stock in an economical manner. The shoe housing also includes a pair of end plates that cooperate in securing the pair of housings to each other. A roadwheel pad of resilient material to molded in situ on one side of the shoe housing to provide the engagement of the shoe with the roadwheels with an associated track laying vehicle with which the track is utilized. The shoe also includes a replaceable road pad of resilient material and a detachable connection for securing the replaceable road pad to the shoe housing on the opposite side thereof as the roadwheel pad for engagement with the ground during the vehicle travel while still permitting replacement when the resilient material of the road pad becomes worn.

In the preferred construction of the track shoe, each shoe housing member defines an elongated pin opening of a generally round cross section extending between the pair of end plates, and each shoe housing member also includes a pair of offset flanges that mate with the offset flanges of the other member. A connection preferably provided by welding secures the flanges of the shoe housing members to each other at a location between the associated elongated pin openings defined by the shoe housing members. These connected flanges of the shoe housing members define a web that extends between the elongated pin openings, and each shoe housing member includes a pin positioning groove located adjacent the web and facing toward its elongated pin opening. The web of the shoe housing preferably includes an opening through which the resilient material of the road pad extends between the opposite sides of the web in order to strengthen the bond between the resilient material of the roadwheel pad and the shoe housing.

The preferred construction of the detachable connection for the replaceable road pad of the track shoe includes at least one pin type connector, a hole in one of the end plates for receiving the pin type connector, and a retainer on the road pad. The pin type connector is inserted into the end plate hole to project outwardly therefrom and engage the retainer in order to secure the road pad to the shoe housing. The pin type connector is removable from the end plate to disengage the retainer in order to permit removal of the road pad for replacement.

In the most preferred construction of the detachable connection for the replaceable road pad, the pin type connector of the connection has a spiral construction including a pointed end. The retainer on the road pad includes a spring retainer portion that is elastically deformed by the engagement thereof with the pointed end of the connector upon insertion thereof through the end plate hole such that a spring force retains the road pad on the track shoe. Preferably, the track shoe also includes a second pin type connector, an associated hole in the other end plate for receiving the second pin type connector, and a retainer including another spring retainer portion that is engaged by the second pin type connector to secure the road pad to the housing.

The invention also involves the construction of the replaceable road pad for the track shoe of the endless track for use with a track laying vehicle. This replaceable road pad includes a sheet metal support formed to include a pair of pin troughs each of which has opposite ends and a generally semicircular cross section that opens in the same direction as the other pin trough. A web of the metal support extends between the two pin troughs thereof to cooperate therewith in defining one half of a binocular configuration. A resilient road pad is made of resilient material molded in situ on the metal support on the opposite side thereof as the direction toward which the pin troughs open. Between the two pin troughs, a retainer is mounted on the web of the metal support and includes a pair of spring retainer portions which are respectively located adjacent the opposite ends of the pin troughs. These spring retainer portions are elastically deformed to provide the mounting of the replaceable road pad on the associated track shoe.

In its preferred construction, the replaceable road pad is formed as an elongated leaf spring having an intermediate portion located between the web of the metal support and the resilient road pad. A connection preferably provided by rivets secures the intermediate portion of the leaf spring to the web of the metal support. Opposite ends of the leaf spring extend from the secured intermediate portion thereof and constitute the spring retainer portions of the retainer for securing the replaceable road pad. Each leaf spring end includes a bent end portion that defines a connector opening for use in securing the replaceable road pad by associated connectors as previously described in connection with to the construction of the shoe of the endless track.

In the most preferred construction of the replaceable road pad, the web of the metal support includes end openings adjacent the ends of the retainer leaf spring to permit elastic deformation thereof upon mounting of the road pad on an associated track shoe. Strengthening ribs are also provided on the metal support extending across the pin troughs at which holes are also provided. The resilient material of the road pad extends into the metal support holes at the pin troughs to cooperate therewith in securing the resilient material of the resilient road pad against movement after the in situ molding on the metal support.

An endless track for use with a track laying vehicle and embodying the invention is of the type including a plurality of shoe assemblies and connectors that extend between the shoe assemblies. Each shoe assembly includes a pair of pin assemblies between which the connectors extend to connect the adjacent shoe assemblies. Each pin assembly includes a sleeve received within the associated shoe assembly. The sleeve includes a pair of sheet metal sleeve members formed to define a round opening through the sleeve. A metal pin is received within the opening in the sleeve and has opposite ends projecting outwardly from the sleeve to permit connection of adjacent shoe assemblies by connectors at the opposite ends of the pins of the shoe assemblies. A resilient bushing is molded in situ between the sleeve and the pin and is bonded to both the sleeve and the pin.

The construction of the pin asembly with the resilient bushing molded in situ between the sleeve and the pin permits the bushing to function by deformation as adjacent shoe assemblies move with respect to each other during vehicle travel. This deformation of the resilient bushing is achieved without the substantial compression necessary with conventional pin bushings of this type.

In the preferred construction of the pin assembly, the sleeve includes a positioning flange cooperatively defined by the sleeve members thereof and the resilient bushing material between the sleeve and the pin. This positioning flange is received within a positioning groove in the associated shoe assembly to prevent rotation of the sleeve with respect to the shoe assembly while rotation of the pin with respect thereto is permitted by the deformation of the resilient bushing as previously described.

The sleeve of the pin assembly preferably includes spaced portions having inner ends spaced from each other with the pin extending therebetween to provide a center connector location for the pin assembly. Outer ends of the spaced portions of the sleeve have the opposite ends of the pin projecting outwardly therefrom to provide end connector locations. Each sleeve portion most preferably includes a pair of the sleeve members which have the same cross section as each other. Each sleeve member includes a main portion defining a generally semicircular cross section and also includes a bent flange portion extending from the semicircular main portion. Cooperation of the associated bent flange portions of each sleeve portion defines the positioning flange thereof which is filled by the resilient bushing material that is molded in situ between the sleeve and the pin. As is hereinafter more fully described, the pin of the pin assembly has a hollow intermediate portion received within the sleeve and also has generally solid ends projecting outwardly from the sleeve to provide a lightweight but high strength construction for connecting the adjacent shoe assemblies.

In accordance with the objectives of the invention, an endless track for a track laying vehicle is of the type including a plurality of shoe assemblies and end connectors that extend between the shoe assemblies with each shoe assembly including a pair of pin assemblies that are of a lightweight but high strength construction. Each shoe assembly includes an elongated pin that extends through the associated shoe assembly and has a hollow intermediate portion for providing a lightweight construction. The hollow intermediate portion of the pin has opposite ends, and the pin includes a pair of opposite ends of a solid construction at the opposite ends of the hollow intermediate portion of the pin. These solid ends of the pin provide high strength locations for attachment of the end connectors that extend between the shoe assemblies.

In the preferred construction of the pin, the hollow intermediate pin portion and the solid pin ends have welded connections to each other. Spin welding is preferably utilized to secure the solid ends to the hollow intermediate portion of the pin, although other types of welding and securement could also be used even though the spin welding is most preferred.

In the most preferred pin construction, each solid pin end has a flat surface for orienting the pin with respect to an associated end connector. Each solid pin end also preferably includes an end connector attachment notch located diametrically opposite the flat surface thereof for orienting the pin. Both the flat surface and the attachment notch of each solid pin end have inner curved portions for preventing stress concentrations upon loading of the pin during use with end connectors attached to the solid pin ends. A tapered end surface of each solid pin end is circumferentially aligned with the attachment notch thereof to facilitate securement of an associated end connector of a construction that is hereinafter more fully described.

In carrying out the objectives of the invention, a center guide is also provided for each shoe assembly of the endless track used for the track laying vehicle. Each shoe assembly with which the center guide is utilized includes a pair of shoes each of which has roadwheel and road pads that face in opposite directions. Each shoe assembly with which the center guide is utilized also includes a pair of pin assemblies that connect the shoes and position the shoes in a laterally spaced relationship with respect to each other.

The center guide constructed in accordance with the invention includes a pair of guide members each of which has a mounting lug portion and a center guide portion. A resilient material is bonded to both guide members with the lug portions and guide portions of each aligned with those of the other to cooperatively provide a mounting lug and a center guide projection. A connection of the center guide secures the mounting lug thereof between the laterally spaced shoes of the associated shoe assembly with the center guide projection extending from the shoe assembly in the direction toward which the roadwheel pads of the shoe face.

The construction of the center guide provides only a guiding function as opposed to conventional track designs wherein the center guide is part of a center connector that connects adjacent shoe assemblies. Isolating the center guide function from the center connector function reduces the loading on the center guide projection in order to provide a greater lifetime of effective use.

In the preferred construction of the center guide, the center guide projection includes an opening through both guide members and through the resilient material that bonds the guide members to each other. The mounting lug portions of the guide members are spaced farther from each other than the guide portions, and each mounting lug portion includes a connector hole for receiving a pin type connector of the connection for securing the center guide between the shoes of the associated shoe assembly. Each guide member also preferably includes a positioning flange located between its mounting lug portion and guide portion. The positioning flanges of the guide members are engageable with the adjacent shoes with the center guide mounted on the associated shoe assembly.

An endless track for use with a track laying vehicle and embodying the invention includes a plurality of shoe assemblies as previously mentioned with each shoe assembly including a pair of pins having opposite ends projecting outwardly from the shoe assembly for connection by end connectors that eliminate the problems associated with conventinal wedge and threaded fastener type end connectors. Each end connector includes a connector body having a pair of holes for receiving the associated pair of pin ends. A spring retainer is mounted on the connector body and resiliently engaged with the pin ends to secure the connector body to the pin ends. With this resilient type of securement, there is no possibility of unthreading as is the case with conventional end connectors.

In the preferred construction of the track end connector, each hole includes a flat surface for orienting the associated pin end. The connector body of the end connector also preferably includes an intermediate opening into each hole with the retainer extending through the openings to secure the associated pin ends. The spring retainer preferably comprises a unitary leaf spring having an intermediate portion secured to the connector body and opposite ends extending from the intermediate portion thereof through the openings into the holes. These opposite ends of the leaf spring extend into the attachment notches of the solid pin ends as previously described and thereby secure the pin ends within the end connector holes. Between its opposite ends, the intermediate portion of the leaf spring retainer preferably has a rivet connection to the connector body to provide an uncomplicated yet effective securement of the leaf spring retainer.

An endless track for use with a track laying vehicle and embodying the invention includes a plurality of shoe assemblies each of which includes a pair of laterally spaced shoes and a pair of round pins extending therebetween, and a center connector is also provides for connecting the adjacent shoe assemblies by extending between the adjacent pins thereof at a location between the laterally spaced shoes. The center connector has a novel construction that prevents unseating during use of the track as the shoe assemblies move with respect to each other.

The center connector of the invention includes a pair of clamp members having two pairs of opposed clamping surfaces. One clamping surface of each pair includes one location for engaging the associated pin with line contact that constitutes the sole engagement thereof with the pin. The other clamp surface of each pair includes two spaced locations for engaging the associated pin with two spaced line contacts that constitute the only engagement thereof with the pin. A connection of the center connector secures the clamp members thereof to each other with each pair of clamping surfaces thereof engaging each pin at the three locations of line contact which form a triangular shape. The three locations of line contact insure secure clamping of each clamping surface without the unseating problem of conventional center connectors.

Each clamp member of the center connector preferably includes a central connection hole and a pair of clamping flanges extending in opposite directions from the central connection hole. One clamp member of the center connector has the clamping flanges thereof each provided with one of the locations for engaging the associated pin with line contact, while the other clamp member has the clamping flanges thereof each provide with the other two locations for engaging the associated pin with line contact.

In the preferred construction of the center connector, the connection between the clamp members includes a threaded bolt that extends through the central hole of both clamp members between the pins connected by the center connector. The connection also includes a nut that is threaded onto the bolt thereof to secure the clamp members to each other with each pair of clamping flanges engaging the associated pin at three spaced locations of line contact as previously described. The one clamp member that engages the associated pin with one location of line contact preferably includes a longitudinal groove extending between its clamping flanges, and the bolt of the connection has a head that is received within the groove and has at least one flat surface positioned by the groove to permit tightening of the nut for securing the clamp members to each other.

As is evident from the above description, the track shoe, the replaceable road pad, the pin assembly, the hollow construction of the pin with its solid ends, the center guide, the end connectors, and the center connector cooperate to provide a modular endless track for use with a track laying vehicle in a manner that solves problems involved with conventional track designs.

The objects, features, and advantages of the present invention are readily apparent from the following detailed description of the best mode for carrying out the invention when taken in connection with the accompanying drawings.

BRIEF DESCRIPTION OF DRAWINGS

FIG. 6 is an exploded perspective view of a binocular-shaped housing of a track shoe of the track;

FIG. 7 is a perspective view of the binocular-shaped shoe housing in its assembled condition;

FIG. 8 is a perspective view of a formed sheet metal support of a replaceable road pad for the track shoe;

FIG. 9 is a perspective view of the replaceable pad after resilient material has been molded in situ on the metal support;

FIG. 21 is an exploded perspective view of the sleeve and pin of a pin assembly of the endless track;

FIG. 22 is a view of the pin assembly after molding of an elastomeric bushing in situ between the sleeve and the pin of the assembly;

FIG. 23 is a partially broken away view of the pin of the pin assembly;

FIG. 24 is an exploded perspective view of a center connector of the endless track;

FIG. 25 is a side view taken in section through the center connector and adjacent pins of adjacent shoe assemblies of the track to illustrate the manner in which the center connector connects the shoe assemblies;

FIG. 26 is an exploded perspective view of an end connector of the endless track;

FIG. 27 is a sectional view taken through the end connector generally along the direction of line 27—27 in FIG. 26 with the end connector connecting adjacent pin ends of adjacent shoe assemblies;

FIG. 28 is a plan view of the end connector taken along the direction of line 28—28 of FIG. 27;

FIG. 29 is a sectional view taken along the direction of line 29—29 in FIG. 26 through the end connector and one of the pin ends connected thereby to illustrate the manner in which the end connector is secured to the pin end;

BEST MODE FOR CARRYING OUT THE INVENTION

Figure 1:
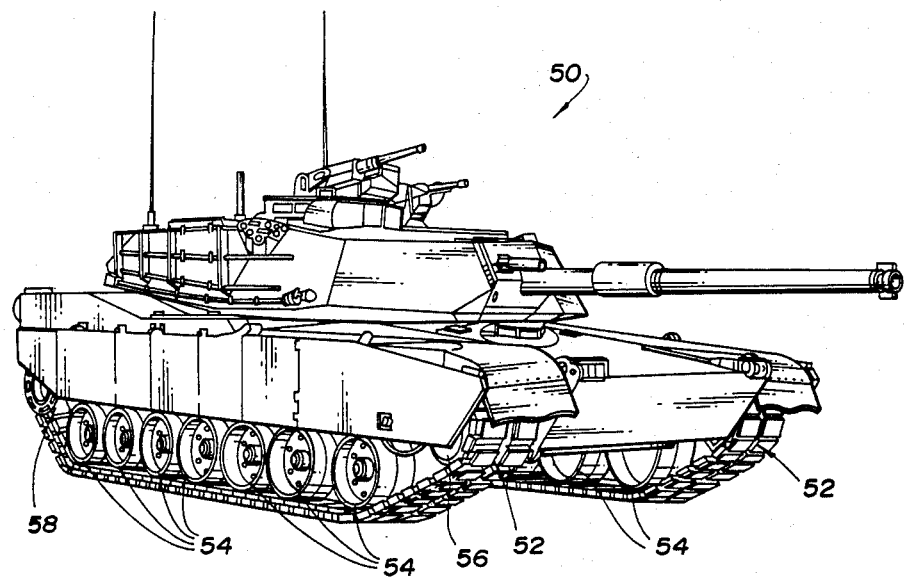
FIG. 1 is a perspective view of a track laying vehicle including a pair of endless tracks embodying the present invention.

With reference to FIG. 1 of the drawings, a track laying vehicle embodied by a tank 50 includes a pair of endless tracks 52 each of which embodies the invention and each of which includes improved components embodying the invention as is hereinafter more fully described. Each endless track 52 is supported for movement below an associated set of roadwheels 54 as well as around a compensating idler wheel 56 and a drive sprocket 58. During operation, the endless tracks 52 are pulled rearwardly under roadwheels 54 by drive sprocket 58 and the unshown upper portion of the track moves forwardly around the idler wheel 56 which is compensated to maintain the track at a predetermined tension.

Figure 2:
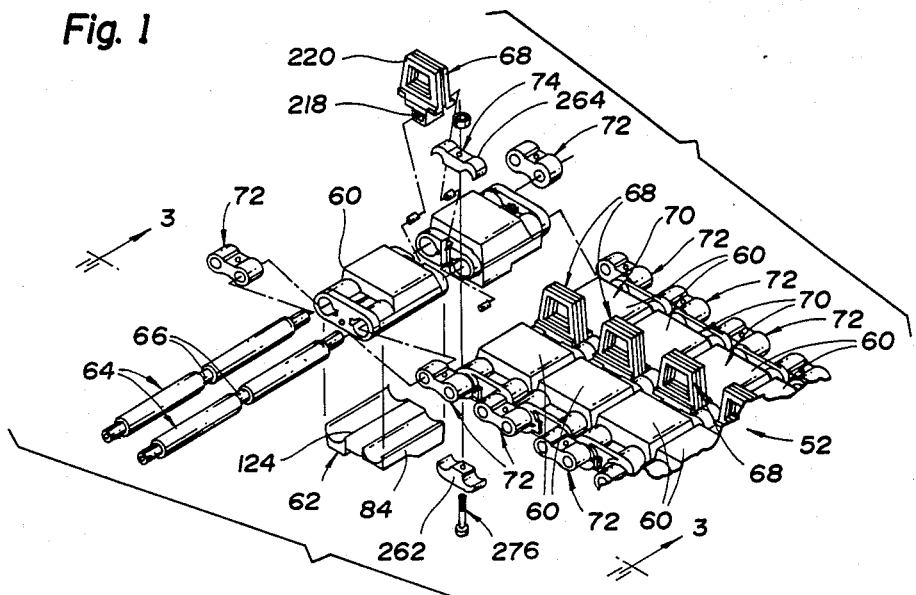
FIG. 2 is a partial exploded perspective view of one of the vehicle tracks embodying the invention.

With reference to FIG. 2, the construction of the endless track 52 will be briefly described to facilitate an understanding of each component thereof prior to a detailed description of the components for a complete understanding of the invention. Along the length of the track 52, two rows of shoes 60 are arranged in a side-by-side relationship and function to support the roadwheels 54 for movement over the ground on which the tank is travelling. Each shoe 60 includes a replaceable road pad 62 illustrated in FIG. 2 for engaging the ground during the vehicle travel. A pair of pin assemblies 64 extend between each aligned pair of track shoes 60 to permit movement of the shoes with respect to each other as the track 52 moves around the roadwheels 54, idler wheel 56, and the drive sprocket 58. Each pin assembly 64 includes a hollow pin 66 of a construction that makes the track 52 lightweight without sacrificing strength of the pins at required locations. Between each laterally aligned pair of track shoes 60, a center guide 68 is provided to guide the track along the associated roadwheels, idler wheel, and drive sprocket. Shoe assemblies 70 are provided by the laterally aligned pairs of shoes 60, the associated pair of pin assemblies 64, and the center guide 68 located between each pair of laterally aligned shoes 60. End connectors 72 connect the adjacent ends of hollow pins 66 associated with adjacent shoe assemblies 70 as is hereinafter more fully described. In addition, each adjacent pair of shoe assemblies 70 are connected by an associated center connector 74 (FIG. 5) extending between intermediate portions of the adjacent pins 66 as is also hereinafter more fully described.

Figure 3:
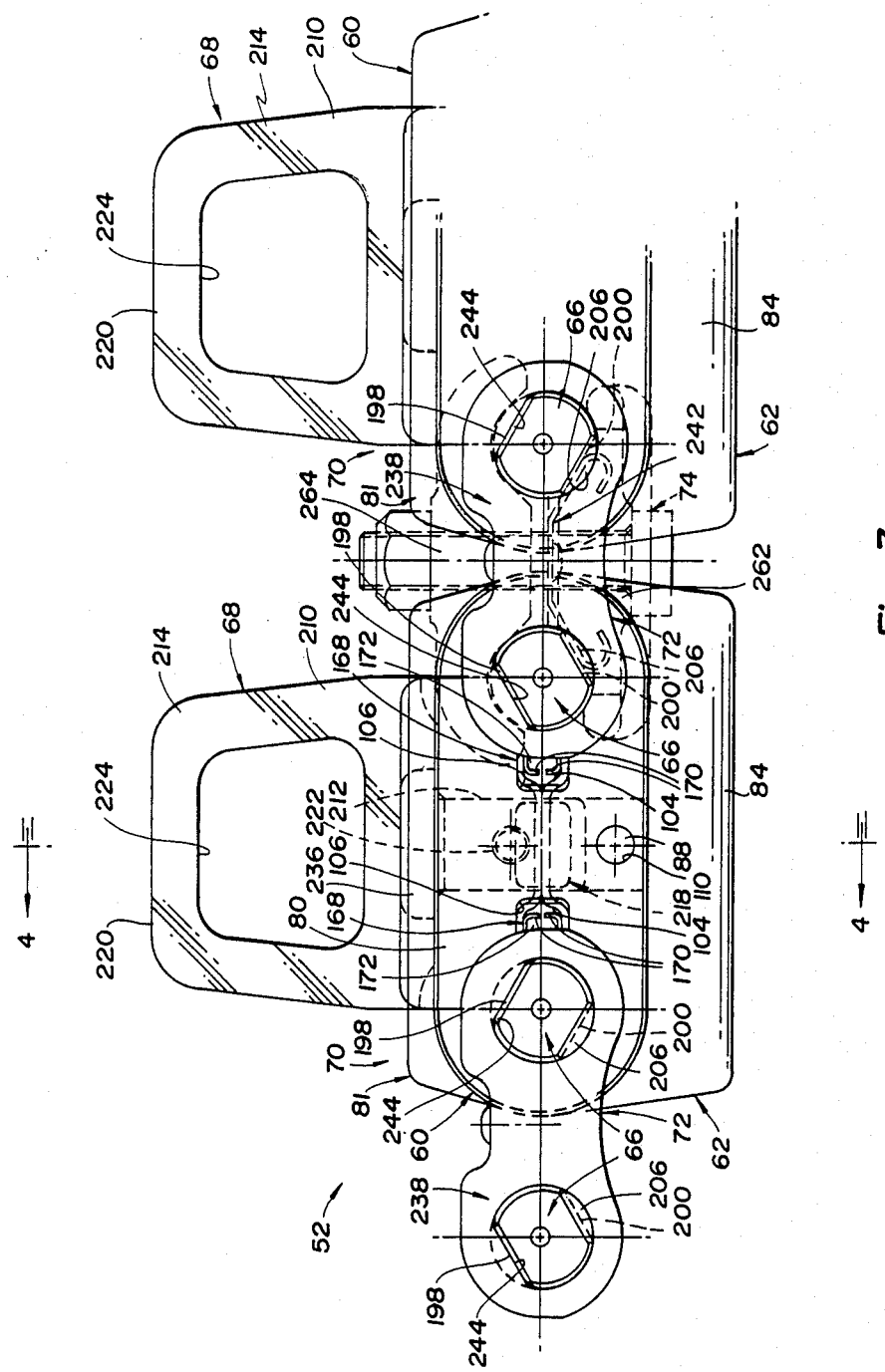
FIG. 3 is a side view of the track taken along the direction of line 3—3 in FIG. 2.
Figure 4:
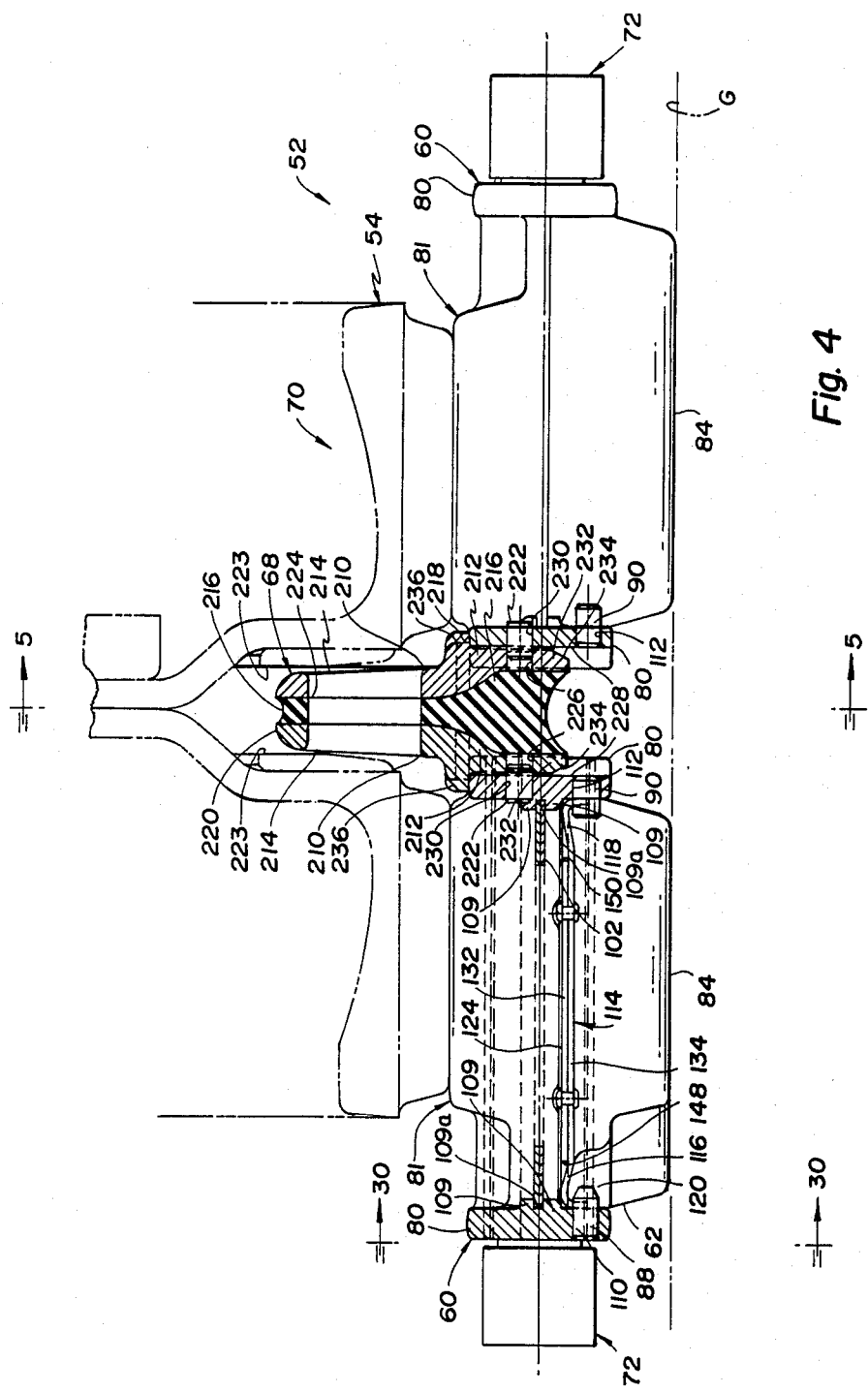
FIG. 4 is a cross sectional view taken through the track along the direction of line 4—4 in FIG. 3.
Figure 31:
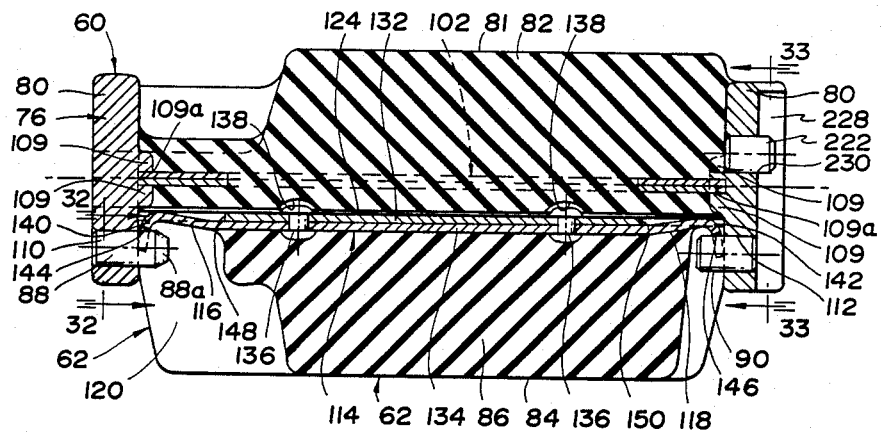
FIG. 31 is a sectional view through the track shoe taken along the direction of line 31—31 of FIG. 30.

As illustrated in FIG. 3, the track shoes 60 of adjacent shoe assemblies 70 are positioned relatively close to each other and are interposed as illustrated in FIG. 4 between the ground G and the roadwheels 54 during driving of the associated tank. As illustrated in FIGS. 6 and 7, each track shoe includes a binocular-shaped shoe housing 76 having a pair of formed sheet metal housing members 78 with the same cross section as each other. The shoe housing 76 also includes a pair of end plates 80 that cooperate in securing the pair of housing members 78 to each other in a manner which is hereinafter more fully described. As best illustrated in FIGS. 14 through 17 and 20, the track shoe also includes a roadwheel pad 81 made of resilient material 82 (FIGS. 16 and 17) that is molded in situ on one side of the shoe housing 76. The replaceable road pad 62 of the track shoe is illustrated in FIGS. 9 through 13, 18, and 19, and includes a resilient road pad 84 molded from resilient material 86 (FIG. 10) for engaging the ground during vehicle travel. First and second pin type connectors 88 and 90 of the track shoe are best illustrated in FIG. 31 and cooperate to provide a detachable connection that secures the replaceable road pad 62 to the shoe housing 76 in a manner which is hereinafter more fully described.

Figure 15:
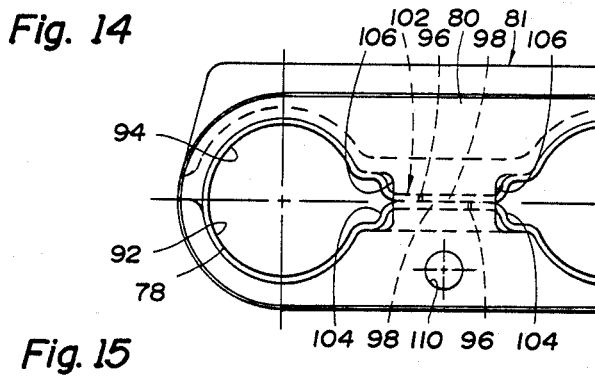
FIG. 15 is an end view of the track shoe taken along the direction of line 15—15 in FIG. 14.
Figure 17:
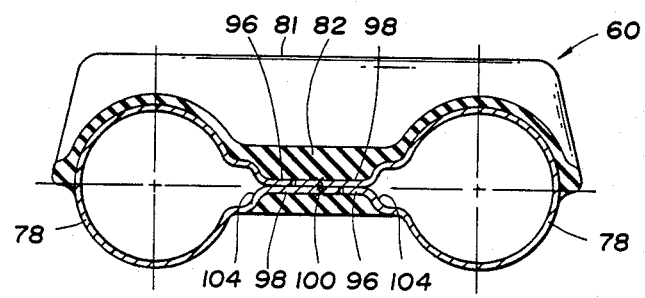
FIG. 17 is a view of the track shoe taken along the direction of line 17—17 in FIG. 14.

With reference to FIGS. 6, 7, and 15, the construction of each shoe housing member 78 preferably defines an elongated pin opening 92 of a generally round cross section extending between the end plates 80 with the ends of the housing members received within complementary associated openings 94 (FIG. 6) in the end plates 80 and secure thereto as illustrated in FIG. 7 by a suitable brazing operation. Each shoe housing member 78 includes a pair of offset flanges 96 and 98 with the one flange 96 shorter than the other flange 98 at each of its ends. The identical cross sections of the housing members 78 are oriented in oppositely facing directions with respect to each other such that the offset flanges 96 and 98 mate with each other as best illustrated in FIG. 17. A connection preferably provided by welds 100 secures the longer flanges 98 to each other to provide securement of the housing members 78 to each other.

Figure 16:
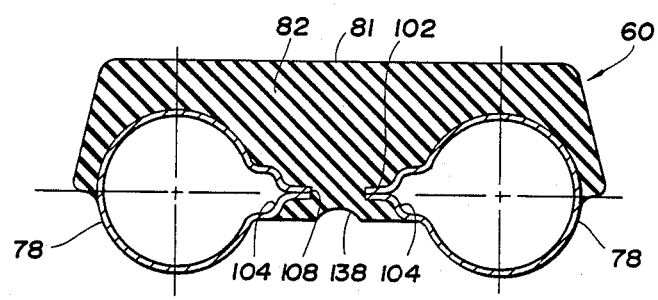
FIG. 16 is a sectional view taken through the track shoe along the direction of line 16—16 in FIG. 14.

As illustrated in FIG. 7, the flanges 96 and 98 of the shoe housing member 78 define a web 102 that extends between the elongated pin openings 92 laterally intermediate the end plates 80. Each shoe housing member 78 as best illustrated in FIG. 15 also includes a pin positioning groove 104 located adjacent the web 102 and facing toward the associated elongated pin opening 92. Each end plate opening 94 also includes a complementary groove portion 106 that receives the housing member portion defining the associated pin groove 104. As is hereinafter more fully described, the pin grooves 104 are utilized to prevent rotation of the pin assemblies 64 previously mentioned in connection with FIG. 2. Between the pin grooves 104, the web 102 of the housing members 78 defines an opening 108 that has an elongated rectangular shape as illustrated in FIG. 7. The roadwheel pad 81 as previously mentioned is molded in situ to the assembled shoe housing 76 with the resilient material 82 thereof extending through the web opening 108 as illustrated in FIG. 16 between the opposite sides of the web 102 in order to enhance the securement of the roadwheel pad to the housing members 78. A suitable adhesive is also preferably applied to the housing members 78 prior to the in situ molding of the roadwheel pad 81 in order to further enhance the securement of the material 82 to the shoe housing.

As best illustrated in FIGS. 4 and 6, the shoe housing end plates 80 each have a pair of lugs 109 that cooperate to define a groove 109a. Opposite ends of the housing member web 102 are received within the lug grooves 109a as best shown in FIGS. 4 and 7 to cooperate with the securement provided by the brazing operation in locating the housing members 78 and the end plates 80 with respect to each other.

As previously mentioned in connection with FIG. 31, the replaceable road pad 62 is detachably secured to the track shoe housing 76 by the first and second pin connectors 88 and 90 which are received within associated holes 110 and 112 of the pair of end plates 80. As is hereinafter more fully described, a retainer 114 of the replaceable road pad 62 has spring retainer portions 116 and 118 which are respectively engaged by ends of the pins 88 and 90 that project outwardly from the associated end plates 80. The first pin type connector 88 is removable from the associated end plate opening 110 by a punching operation, which can easily be performed with a hammer and a punch, and is thereby moved toward the right in the void region 120 defined by the road pad material 86. The spring retainer portion 116 is then free so that the left side of the replaceable road pad 62 can be pivoted downwardly about the right pin connector 90 so as to clear the lower side of the left end plate 80 and permit movement of the replaceable road pad toward the left so that the spring retainer portion 118 disengages the pin connector 90 such that the road pad is then free for replacement.

Figure 32:
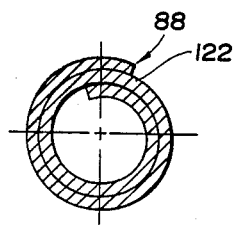
FIG. 32 is a sectional view taken along line 32—32 of FIG. 31 through a spiral pin connector of the type utilized to secure the replaceable road pad to the track shoe.

A new road pad 62 is replaced on the shoe 60 by first inserting the spring retainer portion 118 into engagement with the pin connector 90 and then pivoting the road pad clockwise thereabout into the general position illustrated in FIG. 31. Pin connector 88 which was previously removed as described above is then inserted into the left end of the associated end plate hole 110 and driven to the position shown into engagement with the spring retainer portion 116. During the initial positioning, the spring retainer portion 118 is elastically deformed and the spring retainer portion 116 is subsequently deformed as the pin 88 is driven into the secured position. To facilitate the replacement, the pin 88 has a pointed end 88a that initially engages the spring retainer portion 116. As illustrated by the pin connector 88 illustrated in FIG. 32, both of the pin connectors 88 and 90 have a spiral cross section that insures secure positioning thereof within the associated end plate hole despite manufacturing tolerances while still permitting reuse of the pin connectors after removal from the end plates.

Figure 12:
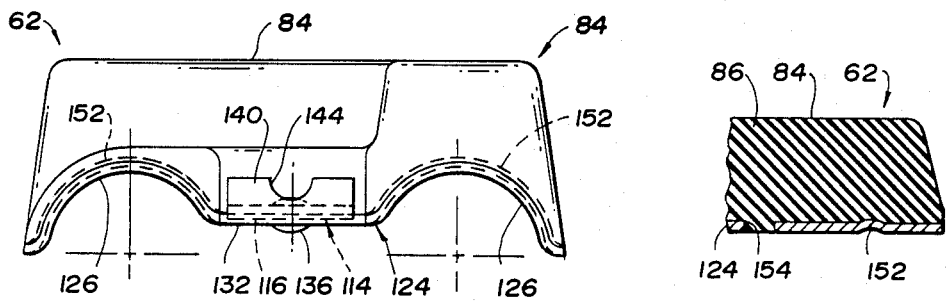
FIG. 12 is an end view of the replaceable road pad taken along the direction of line 12—12 in FIG. 11.

With reference to FIGS. 8 and 9, the replaceable road pad 62 includes a sheet metal support 124 that is formed by a stamping operation to have a pair of pin troughs 126. Each pin trough 126 has opposite ends 128 and 130 and a generally semicircular cross section that opens in the same direction as the other pin trough as illustrated in FIG. 12. The stamped sheet metal support 124 also includes a web 132 extending between the pin troughs 126 as illustrated in FIGS. 8 and 9 to cooperate therewith in defining one half of a binocular configuration. The resilient material 86 of the road pad 84 is molded in situ on the formed metal support 124 on the opposite side thereof as the direction toward which the pin troughs 126 open. A suitable adhesive is preferably applied to the formed metal support 124 to facilitate the securement between the road pad material 86 and the support after the in situ molding.

As best illustrated by combined reference to FIGS. 8 through 11, the spring retainer 114 previously described is mounted on the web 132 of the formed metal support 124 between the two pin troughs 126 and has the pair of spring retainer portions 116 and 118 thereof respectively located adjacent the opposite ends 128 and 130 of the pin troughs. As previously mentioned, these spring retainer portions 116 and 118 are elastically deformed during the mounting of the replaceable road pad 62 on the associated track shoe as previously described.

Figure 10:
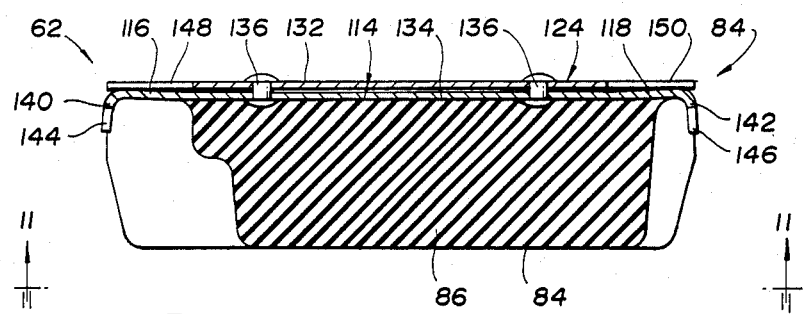
FIG. 10 is a sectional view through the replaceable road pad taken along the direction of line 10—10 in FIG. 9.
Figure 11:
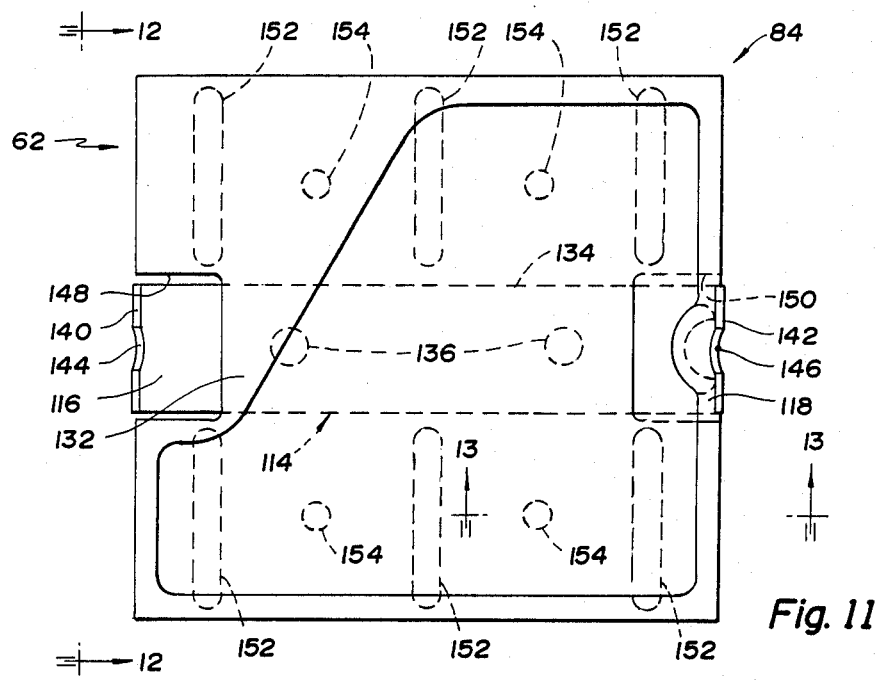
FIG. 11 is a plan view of the replaceable road pad taken along the direction of line 11—11 in FIG. 10.
Figure 18:
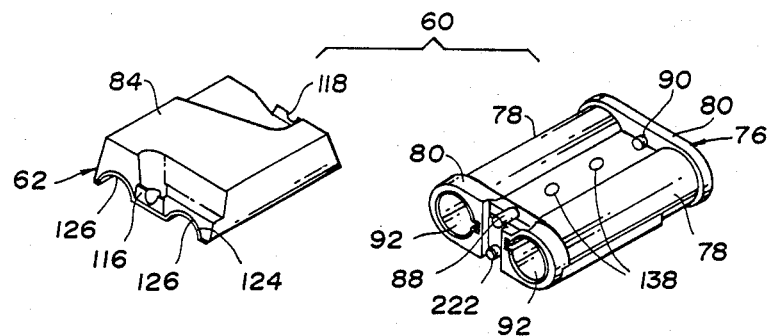
FIG. 18 is a view illustrating the track shoe just prior to assembly of the replaceable road pad to the shoe housing.

As best illustrated in FIGS. 10 and 11, the preferred construction of the retainer 114 is embodied by an elongated leaf spring having an intermediate portion 134 located between the web 132 of the metal support 124 and the resilient road pad 84 provided by the resilient material 86 that is bonded in situ on the support. A pair of rivets 136 provide a connection that secures the intermediate portion 134 of the leaf spring retainer 114 to the support web 132 with the opposite ends of the leaf spring providing the spring retainer portions 116 and 118. Upon assembly of the replaceable road pad 62 to the shoe housing 76, the heads of rivets 136 are received within molded depressions 138 of the roadwheel pad material 82 as illustrated in FIGS. 16 and 18.

As illustrated in FIGS. 10 and 11, the spring retainer portions 116 and 118 that constitute the ends of the leaf spring retainer 114 have respective bent end portions 140 and 142 that define associated connector openings 144 and 146 of semicircular shapes for respectively receiving the pin connectors 88 and 90 previously described in connection with FIG. 31. As illustrated in FIGS. 10 and 11, openings 148 and 150 are provided in the web 132 adjacent the ends of the leaf spring retainer 114 to permit elastic deformation of the spring retainer portions 116 and 118 during the mounting of the replaceable road pad 62 as previously described.

Figure 13:
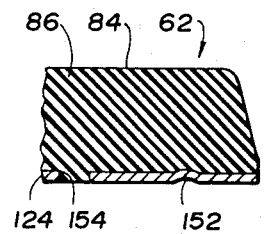
FIG. 13 is a partial sectional view through the replaceable road pad taken along the direction of line 13—13 in FIG. 11.
Figure 14:
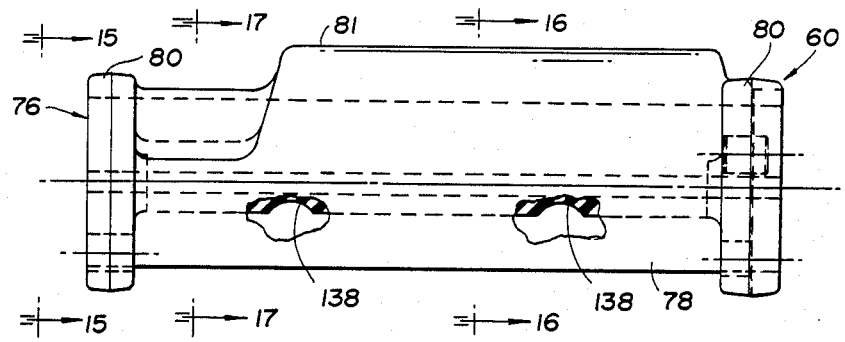
FIG. 14 is a view of the track shoe taken in the same direction as the left shoe illustrated in FIG. 4 with the roadwheel pad bonded thereto but without the replaceable road pad assembled to the shoe.

As best illustrated in FIGS. 8, 9, and 11 through 13, the formed sheet metal support 124 of the replaceable road pad includes strengthening ribs 152 extending across the pin troughs 126. Three of the ribs 152 are provided on each trough 126 as illustrated, with two of the ribs located respectively adjacent the ends of the trough and with a third rib located centrally between the ends of the trough. Also, each trough is provided with holes 154 at the pin troughs with two holes preferably provided on each trough such that there is one hole between each pair of the strengthening ribs 152. As illustrated in FIG. 13, the resilient material 86 of the resilient road pad 84 extends into the holes 154 of the metal support 124 at the pin troughs to cooperate therewith in securing the resilient material after the in situ molding thereof on the support.

Figure 19:
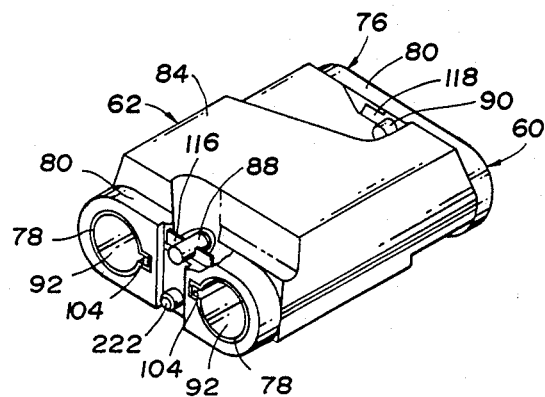
FIG. 19 is a view of the track shoe after the replaceable road pad has been assembled to the shoe housing.
Figure 20:
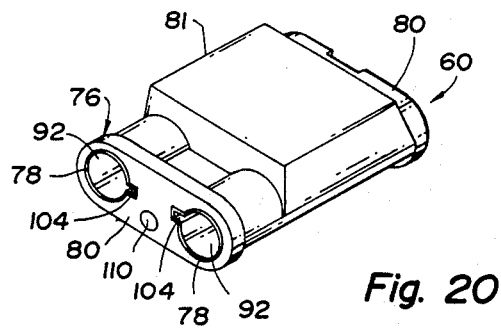
FIG. 20 is a view of the track shoe prior to assembly of the replaceable road pad but flipped upside down from the position of FIG. 18.

The replaceable road pad 62 described above and illustrated in FIG. 18 is thus secured to the track shoe 60 by positioning thereof between the end plates 80 for securement by the pin connectors 88 and 90 as previously described and illustrated in FIG. 19. Prior to the securement of the replaceable road pad 62, the track shoe 60 on the opposite side illustrated in FIG. 18 has the construction illustrated in FIG. 20 where the roadwheel pad 81 is molded in situ to the shoe housing in the manner previously described.

Figure 30:
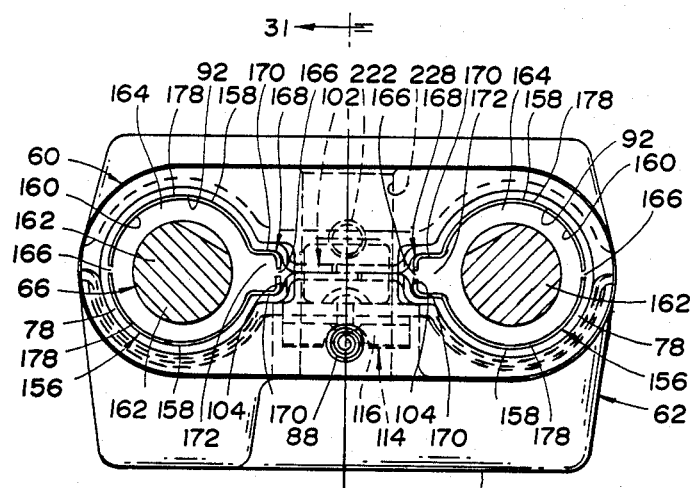
FIG. 30 is an end view of the track shoe taken partially in section through the associated pin ends along the direction of line 30-30 in FIG. 4.

As previously described in connection with FIG. 2, each shoe assembly 70 includes a pair of the laterally aligned track shoes 60 of the construction defined above and a pair of the pin assemblies 64 that connect the pair of track shoes. The construction of each pin assembly 64 as illustrated in FIG. 22 includes a sleeve 156 that is received within the track shoes of the associated shoe assembly as is hereinafter more fully described. Sleeve 156 includes a pair of sheet metal sleeve members 158 that are formed to define a round opening 160 (FIG. 30) through the sleeve. The pin 66 of the assembly 64 is received within the opening of the sleeve 156 as illustrated in FIG. 22 and has opposite ends 162 projecting outwardly from the sleeve 156 to permit connection of adjacent shoe assemblies by connectors at the opposite ends of the pins thereof as is hereinafter more fully described. With the pin 66 positioned within the sleeve 156, a resilient bushing 164 best illustrated in FIG. 30 is molded from a suitable elastomeric material in situ between the sleeve and the pin and is bonded to both the sleeve and the pin such that relative rotation therebetween along the length of the pin assembly is controlled by elastic deformation of the resilient bushing. In order to assist in securing the bonding of the bushing 164, it is preferable to first apply a suitable adhesive to the pin 66 and to the inner side of the sleeve 156 prior to the in situ molding of the bushing.

As best illustrated in FIG. 30, each pin assembly 64 is compressed and then inserted through the housing openings 92 of the associated pair of track shoes 60. Diametrically opposite gaps 166 between the sleeve members 158 are provided to permit the compression that allows the insertion of the pin assembly 64 into the track shoe 60. It should be noted that the amount of compression necessary is relatively small, only on the order of about 5% of so, as compared to the compression necessary with conventional bushings for pin assemblies of conventional tracks wherein the bushings are made as separate components as opposed to the in situ bushing molding herein described. As such, it is much easier to insert the pin assemblies 64 into the track shoes 60 in order to permit replacement or repair of any shoe assembly as may be necessary.

With continuing reference to FIG. 30, each pin and bushing assembly 64 includes a positioning flange 168 received within the associated track shoe housing groove 104 in order to prevent rotation thereof with respect to the track shoe. The positioning flange 168 is cooperatively defined by formed flanges 170 of the sleeve members 158 and by a projecting lug 172 of the bushing 164 with this lug positioned between the sleeve member flanges 170. Ends of the sleeve member flanges 170 are spaced from each other by the adjacent gap 166 previously described so as to permit compression of the bushing lug 172 and the rest of the bushing 164 as previously described during the insertion of the pin assembly 64 into the track shoe.

As best illustrated in FIG. 22, the sleeve 156 of the pin assembly 64 includes spaced sleeve portions 156a with the pin 66 extending therebetween to provide a center connector location 174 for the pin assembly as is hereinafter more fully described. The spaced portions 156a of the sleeve also have outer ends from which the opposite ends 162 of the pin 66 project outwardly to provide end connector locations 176 as is hereinafter more fully described. Each sleeve portion 156a includes a pair of the sleeve members 158 as previously described and best illustrated in FIG. 30. Each of the sleeve members 158 includes a main portion 178 of a generally semicircular cross section and also includes the bent flange portion 170 previously described for cooperating with the bushing lug 172 to provide the positioning flange 168.

Figure 33:
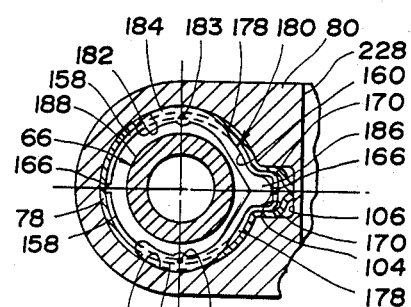
FIG. 33 is a partial sectional view taken through an end plate of the housing along the direction of line 33—33 of the FIG. 31 to illustrate the manner in which the track shoe is secured against axial movement along the pin assembly.

With reference to FIG. 33, the inboard end plate 80 of each track shoe 60 is provided with an Omega-shaped clip 180 associated with each pin assembly 64 to maintain the pin assembly within the track shoe. A suitable milling cutter or other operation is used to provide a pair of slots 182 through each shoe housing member 78 and partially into the inboard end plate as illustrated. After insertion of the pin assembly 64 into the track shoe 60, the slots 182 are positioned inboard from the iner ends of the sleeve members 158 of the pin assembly. The clips 180 have suitable tool holes 183 that are used to force the legs 184 of the clip toward each other in order to permit its assembly as illustrated with a positioning lug 186 thereof aligned with the sleeve flanges 170. The assembled clips 180 thus engage the inner ends of the sleeve members 158 to prevent the pin assemblies 64 from being withdrawn from the track shoes. As is also obvious from FIG. 33, the pin 66 of the pin assembly 64 has a hollow intermediate portion 188 received within the sleeve 156 as well as including the solid ends 162 illustrated in FIG. 23 as is hereinafter more fully described.

With reference to FIG. 23, the pin assembly of each shoe assembly includes the elongated pin 66 which extends through the associated shoe assembly as previously described and has the hollow intermediate portion 188 whose round cross section was previously described in connection with FIG. 33. This hollow intermediate portion 188 of the pin 66 provides a lightweight construction which substantially reduces the weight of the endless track in view of the large number of pins used on each tank vehicle with which two of the endless tracks are used. The hollow intermediate portion 188 of the pin has opposite ends 190 between which a uniform cross section is preferably provided. Pin 66 also includes the pair of opposite ends 162 previously mentioned in connection with the description of the pin assembly 64. These pin ends 162 extend from the ends 190 of the intermediate pin portion 188 and have a solid construction to provide high strength locations for attachment of the end connectors that extend between the shoe assemblies as is hereinafter more fully described.

With continuing reference to FIG. 23, the opposite ends 190 of the hollow intermediate pin portion 188 preferably have welded connections 192 to the solid pin ends 162. These welded connections 192 are most preferably made by a spin welding operation. It will be noted that each solid end 162 of the pin 66 has a round hole 194 aligned with a central hole 196 through the hollow intermediate portion 188 of the pin. These pin end holes 194 facilitate alignment during the spin welding operation that provides the welded connections 192.

As illustrated by combined reference to FIGS. 23, 27, and 29, each solid pin end 162 has a flat surface 198 for orienting the pin with respect to an associated end connector as is hereinafter more fully described. In addition, each solid pin end 162 also includes an end connector attachment notch 200 located diametrically opposite the flat surface 198 thereof that is utilized to orient the pin. The flat surface 198 of the pin end has a curved inner portion 202 while the attachment notch 200 has a curved inner portion 204. These curved inner portions 200 and 204 prevent stress concentrations upon loading of the pin during use. Also, each solid pin end 162 has a tapered end surface 206 circumferentially aligned with the attachment notch 200 to facilitate mounting of an associated end connector as is hereinafter more fully described. It will be noted that each solid pin end 162 is shown with an end hole 208 which is used in supporting the pin during its fabrication. While the end holes 208 render the pin ends 162 less than completely solid, the cross sections of the pin ends are completely solid inwardly from where the associated end connectors are mounted just outward from the outer ends of the holes 194. The solid locations are where the stresses of the pin ends are primarily carried and thereby provide a high strength construction despite the hollow construction of the intermediate portion 188 for weight reduction.

With reference to FIGS. 3 and 4, the center guide 68 of each shoe assembly 70 is located between the pair of shoes 60 thereof whose roadwheel pads 81 and road pads 84 face in opposite directions and are connected by the associated pair of pin assemblies as previously described. It should be noted that the center guide 68 of each shoe assembly 70 does not perform any connecting function between the adjacent shoe assemblies and the loading thereof is thus not subjected to any additional forces other than that necessary to provide the guiding function of the track on the associated vehicle.

As illustrated in FIG. 4, the center guide 68 includes a pair of guide members 210 each of which has a mounting lug portion 212 and a center guide portion 214. A resilient material 216 is bonded to both guide members 210, preferably by an in situ molding operation wherein a suitable adhesive is first applied to each guide member to enhance the bonding. The lug portions 212 and guide portions 214 of each guide member 210 are aligned with those of the other after the in situ molding to cooperatively provide a mounting lug 218 and a center guide projection 220. A connection provided by pin type connectors 222 secures the mounting lug 218 between the laterally spaced shoes 60 of the associated shoe assembly 70, in a manner which is hereinafter more fully described, with the center guide projection 220 extending from the shoe assembly in the direction toward which the roadwheel pads 81 of the shoe assembly face. The projection 220 is received between laterally spaced guide plates 223 of the roadwheels 54 to provide the guiding function that maintains the track in position with respect to the roadwheels during vehicle travel.

Figure 5:
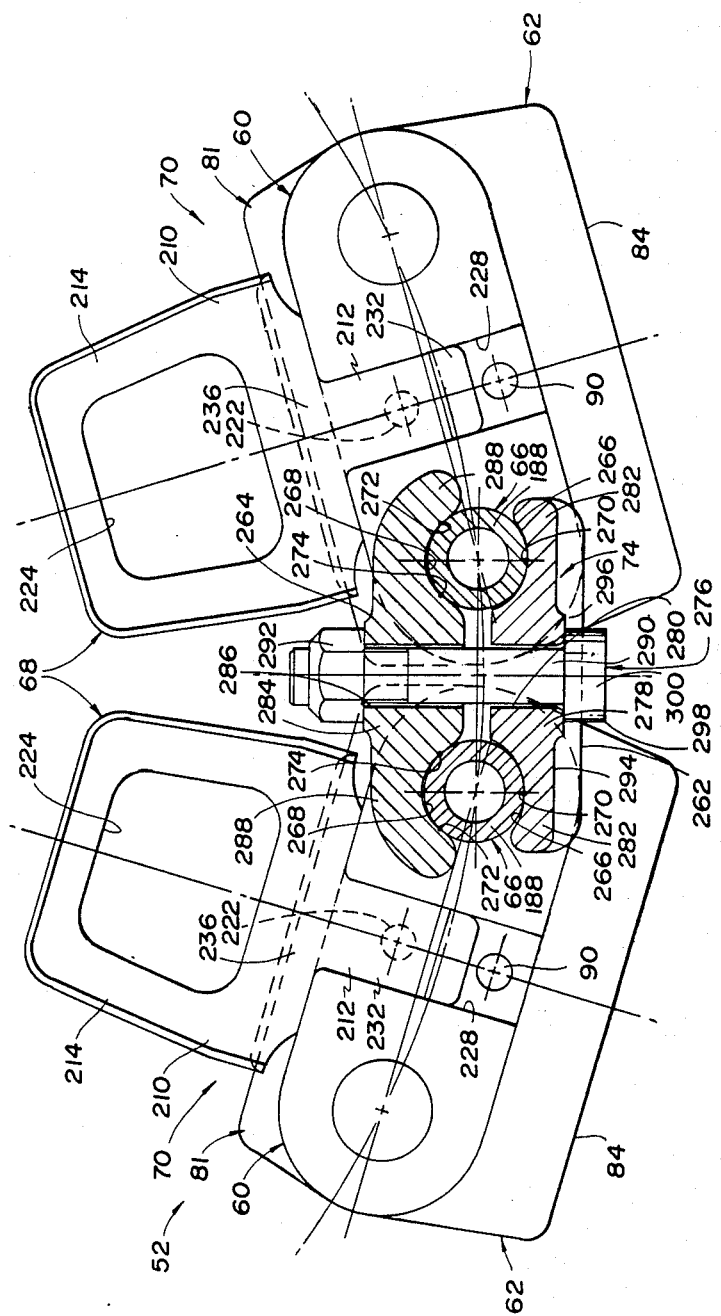
FIG. 5 is a partial sectional view taken along the directional of line 5—5 of FIG. 4 with the track illustrated as shoe assemblies thereof move with respect to each other during vehicle travel.

As illustrated in FIGS. 1, 4, and 5, the center guide 68 has its center guide projection 214 provided with an opening 224 through both guide portions 214 and through the resilient material 216 that bonds the guide members 210 to each other. Below the opening 224 as viewed in FIG. 4, the mounting lug portions 212 of the guide members 210 are spaced farther from each other than the guide portions 214 to provide an additional amount of resilient material 216 at this location and a resultant increased extent of compressibility that facilitates removal of the center guide as described below. Each mounting lug portion 212 includes a connector hole 226 for receiving the associated pin connector 222. The pair of pin connectors 222 preferably have the spiral configuration previously described in connection with FIG. 31 and cooperate to secure the center guide 68 between the shoes 60 of the associated shoe assembly 70.

As illustrated in FIGS. 30 and 31, the inboard end plate 80 of each track shoe 60 includes a vertical slot 228 into which the associated pin connector 222 projects from a mounting hole 230 in the end plate. Each guide member 210 as illustrated in FIG. 5 has its mounting lug provided with a mounting flange 232 that is received within the associated end plate slot 228 with the pin connector 222 thereof securing the center guide in position in cooperation with the other pin connector on the other side of the center guide. At the lower end of the center guide 68, the mounting flanges 232 are provided with tapered surfaces 234 that converge in a downward direction. A suitable tool with tapered surfaces for engaging the tapered flange surfaces 234 is utilized to force the mounting lug portions 212 toward each other in order to remove the center guide 68 when replacement or repair is necessary. Such movement of the mounting lug portions 212 toward each other releases the center guide 68 from the shoe assembly when the mounting flanges 232 clear the inner ends of the pin connectors 222. Likewise, the tapered surfaces 234 engage the ends of the pin connectors 222 upon mounting and force the mounting lug portions 212 toward each other in order to permit downward movement of the center guide until the pin connectors 222 move into the associated holes 226 for securement. Each guide member 210 is provided with a positioning flange 236 located between its guide portion 210 and mounting lug portion 212 and engageable with the upper edge of the adjacent shoe end plate 80 to properly position the center guide in the mounted relationship.

With reference to FIG. 2, the endless track 52 for the track laying vehicle includes a plurality of shoe assemblies of the construction as previously described with each shoe assembly including the pair of pins 66 whose ends 162 project outwardly from opposite lateral sides of the shoe assembly. End connectors 72 connect the adjacent pin ends 162 of adjacent shoe assemblies 70 in a manner more specifically described below.

With reference to FIGS. 26 through 29, the construction of the end connector 72 includes a connector body 238 having a pair of holes 240 for receiving the associated pair of pin ends 162. A spring retainer 242 is mounted on the connector body 240 and resiliently engaged with the pin ends 162 to secure the connector body to the pin ends and thereby provide interconnection of the adjacent shoe assemblies with which these pin ends are associated. Provision of the spring retainer 242 for securing the pin ends with the connector body 238 in the manner described eliminates the necessity for a conventional wedge connector with an associated threaded connection that can be loosened as previously described. Furthermore, as is hereinafter obvious from the following discussion of the specific construction of the end connector 72, removal and installation of the end connector is much easier and faster so as to facilitate field maintenance and repair in the same manner involved with all of the other components of the endless track.

As best illustrated in FIG. 26, each hole 240 includes a flat surface 244 for orienting the associated pin end 162 by engaging its flat surface 198 as illustrated in FIG. 27. Other than the flat surface 244, the rest of each hole 240 has a round shape which is concentric with the central axis of the associated pin end 162. An elongated grove 246 of the connector body is illustrated in FIGS. 27 and 28 and defines an intermediate opening 248 into each hole 240 with retainer 242 extending through the openings to secure the associated pin ends 162. The groove 246 also includes a retainer seat 250 on which the spring retainer 242 is mounted as described below.

As illustrated in FIGS. 26, 27, and 28, the spring retainer 242 comprises a unitary leaf spring 252 that is received within the connector body groove 246 so as not to be exposed during use. Retainer leaf spring 242 includes an intermediate portion 254 that is secured in engagement with the retainer seat 250 by a connection preferably embodied by a rivet 256 as best illustrated in FIG. 27. Opposite ends 258 of the retainer leaf spring 252 extend from the intermediate portion 254 thereof through the associated pair of intermediate openings 248 into the holes 240 for engagement with the associated pin ends 162. Each retainer spring end 258 engages the associated pin end 162 within the notch 200 in the assembled position so as to thereby retain the end connector 72 on the pin end. Each retainer spring end 258 preferably has its extreme end portion 260 formed in a hook shape as best illustrated in FIG. 27 so that it can be grasped with a suitable tool and deflected to permit removal of the end connector 72 from the associated pair of pin ends 162. Upon assembly, the end connector 72 is moved over the associated pair of pin ends 162 and the opposite ends 258 thereof engage the tapered end pin surfaces 206 (FIG. 29) of the pins so as to be elastically deflected prior to movement into the associated notches 200 as illustrated.

As is evident from the above description of the end connector 72, the construction involved facilitates assembly of the end connector as well as facilitating disassembly so that field maintenance and repair can be performed. In addition, the construction of the end connector 72 provides an effective interconnection between adjacent shoe assemblies 70 by engaging the adjacent pin ends thereof without requiring any conventional wedge type connector and an associated threaded connector that can become loosened during use.

With reference to FIG. 2, the endless track 52 for the track laying tank type vehicle described includes a plurality of the shoe assemblies 70 as previously described with each including a pair of laterally spaced shoes 60 and a pair of round pins 66 extending between the shoes with the center connectors 74 connecting adjacent shoe assemblies by extending between adjacent pins thereof at a location between the laterally spaced pairs of shoes. As previously mentioned in connection with the description of the center guide 68, the guiding function provided by the center guide and the connecting function provided by the center connector 74 are separate so that the loading for each function does not provide loading of the component providing the other function. Such separation of the loading for the guiding and center connecting functions provides the resultant endless track 52 with greater ability to withstand loading and hence a more extended lifetime than tracks where the center guide and center connector are combined as one component.

With reference to FIGS. 3, 24, and 25, the center connector 74 includes a pair of clamp members 262 and 264 which include two pairs of clamping surfaces 266 and 268. One clamping surface 266 of each pair of clamping surfaces includes one location 270 for engaging the associated pin 66 at its center connector location 174 (FIG. 22) with line contact that constitutes the sole engagement thereof with the pin. The other clamping surface 268 of each pair includes two spaced locations 272 and 274 of line contact for providing the only engagement thereof with the center connector location 174 (FIG. 22) of the associated pin 66. A connection generally indicated by 276 secures the clamp members 262 and 264 to each other with each pair of clamping surfaces 266 and 268 thereof engaging each pin center connector location 174 (FIG. 22) at the three locations of line contact which form a triangular shape with each other as best illustrated in FIGS. 5 and 25. By engaging the pins with three locations of line contact in the triangular shape disclosed, there is no unseating problem as is the case with conventional center connectors where there is surface-to-surface contact or four or more locations of engagement. With these conventional center connectors, tolerances result in a connector that cannot maintain a seated relationship with the pins during an extended lifetime of use.

As best illustrated in FIG. 24, clamp member 262 includes an intermediate portion 278 having a central connection hole 280 and also includes a pair of clamping flanges 282 extending in opposite directions from the connection hole with the one clamping location 270 provided on each of these clamping flanges. The other clamp member 266 includes an intermediate portion 284 having a central connection hole 286 and also includes a pair of clamping flanges 288 extending in opposite directions from its connection hole with the two clamping locations 272 and 274 provided on each of these clamping flanges.

As illustrated in both FIGS. 24 and 25, the connection 276 preferably includes a threaded bolt 290 that extends through the central connection holes 280 and 286 of both clamp members 262 and 264 at a location between the two pins 66 connected by the center connector 74. A nut 292 of the connection 276 is threaded onto the bolt 290 to secure the clamp members 262 and 264 to each other with each pair of clamping flanges 282 and 288 engaging the associated pin 66 at three spaced locations 270, 272, and 274 of line contact as previously described. The one clamp member 262 opposite the nut 292 includes a longitudinal groove 294 extending between the clamping flanges 282 thereof and having a pair of side surfaces 296 that face toward each other. The bolt 290 of the connection has a head 298 that is received within the groove 294 and has a pair of flat surfaces 300 engaged with the side surfaces 296 of the groove 294 in the one clamp member 262 in order to permit tightening of the nut 292 without any tool positioning the bolt.

While the best mode for carrying out the invention has been described in detail, those familiar with the art to which this invention relates will recognize various alternative ways of practicing the invention as defined by the following claims.

What is claimed is:

1. A replaceable road pad for a track shoe of an endless track for a track laying vehicle, said replaceable road pad comprising: a sheet metal support having a pair of pin troughs each of which has opposite ends and a generally semicircular cross section that opens in the same direction as the other pin trough; the metal support also including a web extending between the two pin troughs thereof to cooperate therewith in defining one half of a binocular configuration; a resilient road pad made of resilient material molded in situ on the metal support on the opposite side thereof as the direction toward which the pin troughs open; a retainer mounted on the web of the metal support between the two pin troughs thereof; and said retainer including a pair of spring retainer portions which are respectively located adjacent the opposite ends of the pin troughs thereof and which are elastically deformed to provide mounting of the replaceable road pad on the associated track shoe.

2. A replaceable road pad as in claim 1 wherein the retainer comprises an elongated leaf spring having an intermediate portion located between the web of the metal support and the resilient road pad, a connection for securing the intermediate portion of the leaf spring to the web of the metal support, and the leaf spring having opposite ends that constitute the spring retainer portions of the retainer.

3. A replaceable road pad as in claim 2 wherein each leaf spring end includes a bent end portion that defines a connector opening.

4. A replaceable road pad as in claim 3 wherein the web of the metal support includes end openings adjacent the ends of the retainer leaf spring to permit elastic deformation thereof upon mounting of the replaceable road pad.

5. A replaceable road pad as in claim 1 or 4 wherein the metal support includes strengthening ribs extending across the pin troughs and also includes holes at the pin troughs, and the resilient material of the resilient road pad extending into the metal support holes at the pin troughs to cooperate therewith in securing the resilient material.

* * * * *

UNITED STATES PATENT AND TRADEMARK OFFICE
CERTIFICATE OF CORRECTION

PATENT NO.   : 4,765,694
DATED        : August 23, 1988
INVENTOR(S)  : Robert M. Cory It is certified that error appears in the above-identified patent and that said Letters Patent is hereby corrected as shown below:

| | |
|---|---|
| Column 1, Line 20, | "spocket" should be --sprocket--. |
| Column 2, Line 51, | after "These", change "ends" to --end--. |
| Column 3, Line 25, | "to" should be --is--. |
| Column 4, Line 46, | delete "to". |
| Column 6, Line 66, | "conventinal" should be --conventional--. |
| Column 7, Line 29, | "provides" should be --provided--. |
| Column 7, Line 59, | "provide" should be --provided--. |
| Column 13, Line 56, | after "5%", "of" should be --or--. |
| Column 16, Line 62, | after "body", "240" should be --238--. |
| Column 17, Line 25, | after "spring", "242" should be --252--. |

Signed and Sealed this

Sixteenth Day of May, 1989

Attest:

DONALD J. QUIGG

Attesting Officer          Commissioner of Patents and Trademarks